US012769474B2

(12) United States Patent
Parsons et al.

(10) Patent No.: US 12,769,474 B2
(45) Date of Patent: Oct. 20, 2026

(54) METHODS AND SYSTEM TO REMOVE DATA FROM MOBILE DEVICE

(71) Applicant: Communications Test Design, Inc., West Chester, PA (US)

(72) Inventors: Jerry Parsons, West Chester, PA (US); Brian Parsons, West Chester, PA (US); Sean Parsons, West Chester, PA (US); Jim Rhodes, West Chester, PA (US); Mark Parsons, West Chester, PA (US); Nidhin Davis, Glen Mills, PA (US); Brian Greenwald, West Chester, PA (US)

(73) Assignee: Communications Test Design, Inc., West Chester, PA (US)

( * ) Notice: Subject to any disclaimer, the term of this patent is extended or adjusted under 35 U.S.C. 154(b) by 834 days.

(21) Appl. No.: 17/938,231

(22) Filed: Oct. 5, 2022

(65) Prior Publication Data

US 2024/0118824 A1 Apr. 11, 2024

(51) Int. Cl.
*G06F 3/06* (2006.01)

(52) U.S. Cl.
CPC .......... *G06F 3/0652* (2013.01); *G06F 3/0604* (2013.01); *G06F 3/0673* (2013.01)

(58) Field of Classification Search
CPC ..... G06F 3/0652; G06F 3/0604; G06F 3/0673
See application file for complete search history.

(56) References Cited

U.S. PATENT DOCUMENTS

| | | | | |
|---|---|---|---|---|
| 5,974,312 | A * | 10/1999 | Hayes, Jr. | H04W 8/245 455/418 |
| 9,189,378 | B1 * | 11/2015 | Ryan | G06F 11/3698 |
| 9,721,660 | B2 * | 8/2017 | Kelly | G06F 11/1441 |
| 10,162,693 | B1 | 12/2018 | Contino et al. | |
| 10,445,708 | B2 * | 10/2019 | Hunt | H04M 1/0287 |
| 12,099,831 | B2 * | 9/2024 | Parsons | G06F 11/273 |
| 2003/0048256 | A1 * | 3/2003 | Salmon | H05K 3/363 345/168 |
| 2008/0126863 | A1 * | 5/2008 | Co | G11C 29/56 714/E11.169 |
| 2020/0151679 | A1 | 5/2020 | Hunt et al. | |
| 2021/0067957 | A1 | 3/2021 | Parsons et al. | |
| 2021/0099648 | A1 * | 4/2021 | Ikeda | H04N 23/80 |
| 2022/0156543 | A1 * | 5/2022 | Huang | G01D 21/00 |
| 2023/0315068 | A1 * | 10/2023 | Lin | G11C 29/56016 700/109 |
| 2024/0020653 | A1 * | 1/2024 | McConnell | G06Q 10/20 |

OTHER PUBLICATIONS

Mbaka, Jide, How to Fix a Broken Charger, Sep. 18, 2022, Carlcare, (https://www.carlcare.com/ng/tips-detail/fix-broken-charger/), 4 pages (Year: 2022).*

(Continued)

*Primary Examiner* — Lewis G West
(74) *Attorney, Agent, or Firm* — Duane Morris LLP

(57) ABSTRACT

Methods to remove data from a mobile device, such as a smartphone, a smart watch, a tablet, or the like include stepwise verification of operation of hardware components of the mobile device prior to using a software tool to erase the data from the mobile device.

12 Claims, 4 Drawing Sheets

(56) References Cited

OTHER PUBLICATIONS

Opinaldo, Norlyn, Useful Ways to Control Android with Broken Screen, Oct. 13, 2021, AirMore, 9 pages (Year: 2021).*
Gordon, "What to Do If Your Phone Won't Turn On." In: pcmag.com, Aug. 14, 2021, [online] [retrieved on Feb. 7, 2024 (Feb. 7, 2024)] Retrieved from the Internet< URL: https://web.archive.org/web/20220721032920/https://www.pcmag.com/how-to/what-to-do-if- aphone-wont-turn-on>.
Dodge, "How do you tell if your laptop power port is the problem or your power charger?" In: quora.com, Oct. 15, 2016, [online] [retrieved on Feb. 7, 2024 (Feb. 7, 2024)] Retrieved from the Internet< URL: https://www.quora.com/How-do-you-tell-if-your-laptop-power-port-is-the-problem-or-your-powercharger/answer/Braden-Dodge/log>.
Bednar, "How to Destroy Old Cell Phones." In: securedatarecovery.com, Aug. 12, 2020, [online] [retrieved on Feb. 7, 2024 (Feb. 7, 2024)] Retrieved from the Internet< URL: https://www.securedatarecovery.com/blog/destroy-old-cell-phones>.
International Search Report and Written Opinion for corresponding PCT International Application No. PCT/US2023/074854 dated Apr. 4, 2024, 12 pages.
Brainers Technology, "How to recover data from broken Android phone—display screen damaged mobile." In: youtube.com, May 26, 2022, [online] [retrieved on Feb. 7, 2024 (Feb. 7, 2024)] Retrieved from the Internet<URL: https://www.youtube.com/watch?v=fEWf1tvlc18>.
ProFixerr, "How to test tristar on an iPhone using a multimeter—Repair Shop Basics." In: youtube.com, Jul. 27, 2020, [online] [retrieved on Feb. 7, 2024 (Feb. 7, 2024)] Retrieved from the Internet <URL: https://www.youtube.com/watch?v=FaSIgLRTkc>.
IPad Rehab Microsoldering & Data Recovery "iPhone X Data Recovery—Will it boot if you swap the mainboard and RF boards?" In: youtube.com, Aug. 6, 2018, {online} {retrieved on Feb. 7, 2024 (Feb. 7, 2024)] Retrieved from the Internet <URL: https://www.youtube.com/watch?v=IKoWQpmV1WQ>.

* cited by examiner

METHODS AND SYSTEM TO REMOVE DATA FROM MOBILE DEVICE

FIELD

The present disclosure relates to methods and system to remove data, and more specifically, to methods and system to remove customer data from mobile devices.

BACKGROUND

Mobile devices, including tablets and smartphones, have become sophisticated, widespread, and pervasive. With the increasing usage of computer network services all over the world, these mobile devices are in great demand. As a result, the cost of returned, used, and refurbished mobile devices has increased. As with any used mobile device, the customer data on the used device needs to be erased, deleted, or wiped from memory before resale because of privacy and personal security concerns. As the number of used mobile devices increases, and the data on the used mobile devices increases, removing customer data of various mobile devices is not only complicated, but also time consuming and expensive. Additionally, current methods are not one-hundred percent effective and leave a significant amount of mobile devices unable to be resold because the customer data cannot be removed. Typically, these devices that cannot be resold must be scrapped.

SUMMARY

The present disclosure relates to methods to remove data, and more specifically, to methods to remove customer data from mobile devices.

The exemplary embodiments disclosed herein are directed to solving the issues relating to one or more of the problems presented in the prior art, as well as providing additional features that will become readily apparent by reference to the following detailed description when taken in conjunction with the accompanying drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

In one embodiment, a method to remove data from a mobile device includes (a) checking if the mobile device powers on; (b) if the mobile device powers on in step (a), checking if the mobile device charges; (c) if the mobile device charges in step (b), using a software tool to erase the data from the mobile device; (d) if the mobile device does not power on in step (a), connecting the mobile device to a charger and checking if the mobile device powers on; (e) if the mobile device does not power on in step (d), cleaning a charging connector of the mobile device; (f) after step (e), checking if the mobile device charges; (g) after steps (d) or (f), charging the mobile device for a period of time; (h) after step (g), using a software tool to erase the data from the mobile device.

In another embodiment, a method to remove data from a mobile device includes disassembling the mobile device; connecting the mobile device to a known good power supply; checking if the mobile device powers on; for a condition when the mobile device powers on, checking if a battery of the mobile device charges; for a condition when the mobile device does not power on, replacing a charging connector; after replacing the charging connector, checking if the mobile device charges; and for a condition when the mobile device charges, using a software tool to erase the data from the mobile device.

In another embodiment, a method to remove data from a mobile device includes disassembling the mobile device; removing a motherboard from the mobile device; connecting the motherboard to known good compatible circuitry; checking if the motherboard connected to the compatible circuitry powers on; for a condition when the motherboard powers on, checking a charging operation of the motherboard; and for a condition when the motherboard powers on and the charging operation is operating, using a software tool to erase the data from the motherboard.

In another embodiment, a system to remove data from a mobile device includes a mobile device interface to interface with the mobile device; a monitor that displays a same image as that provided to a display of the mobile device; and a computer to interface to the mobile device interface and erase data from the mobile device.

The disclosed methods permit refurbishment or reuse of previously used mobile devices and/or motherboards of mobile device that contain customer data that currently cannot be reused and are being physically destroyed or scrapped.

BRIEF DESCRIPTION OF THE DRAWINGS

Various exemplary embodiments of the present disclosure are described in detail below with reference to the following Figures. The drawings are provided for purposes of illustration only and merely depict exemplary embodiments of the present disclosure to facilitate the reader's understanding of the present disclosure. Therefore, the drawings should not be considered limiting of the breadth, scope, or applicability of the present disclosure. It should be noted that for clarity and ease of illustration these drawings are not necessarily drawn to scale.

DETAILED DESCRIPTION

Figure 1:
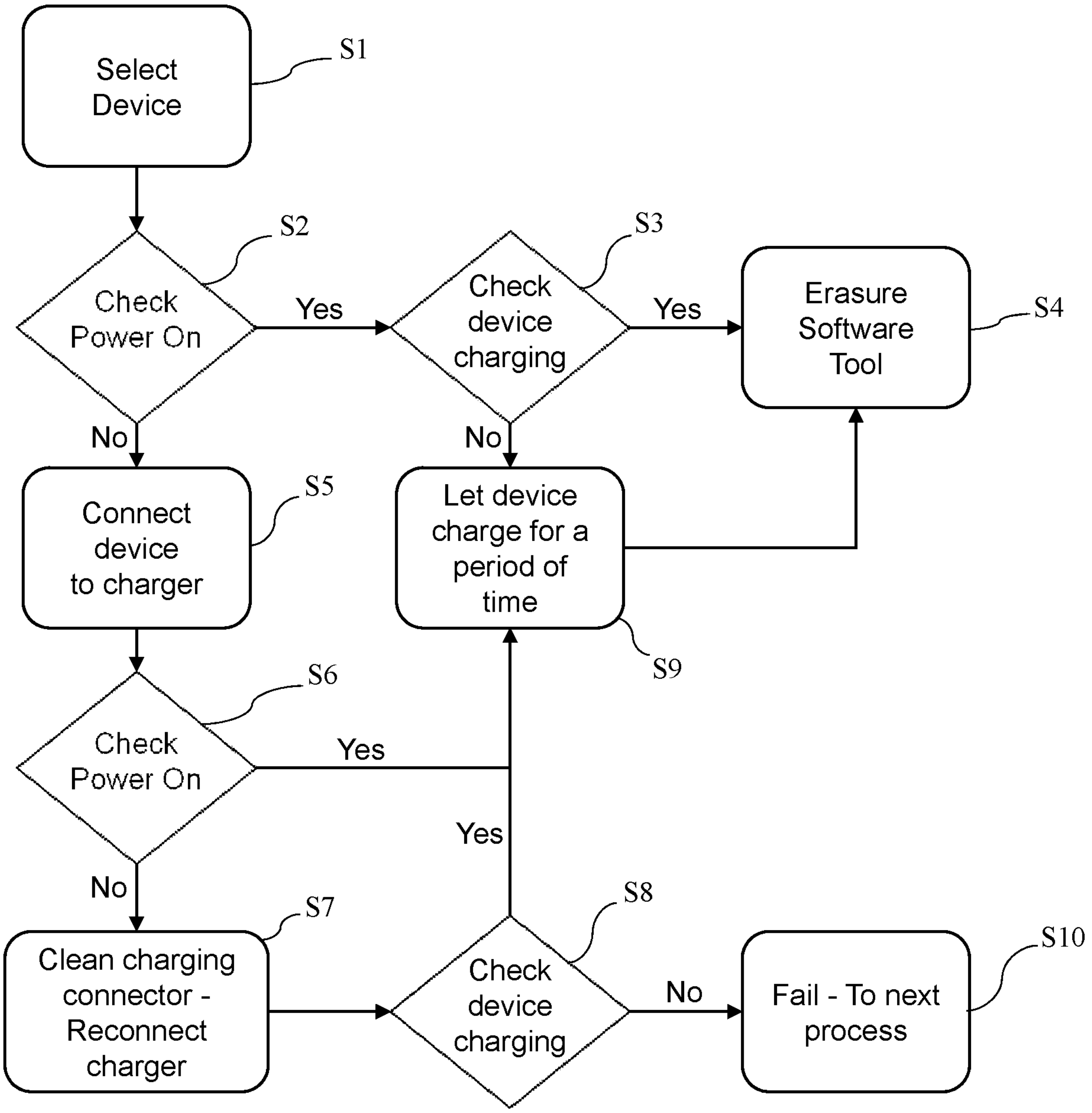
FIG. 1 is flowchart of a method to remove data from a mobile device according to an embodiment of the disclosure.

Various exemplary embodiments of the present disclosure are described below with reference to the accompanying figures to enable a person of ordinary skill in the art to make and use the present disclosure. As would be apparent to those of ordinary skill in the art, after reading the present disclosure, various changes or modifications to the examples described herein can be made without departing from the scope of the present disclosure. Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

An object of the present disclosure, among others, is to provide methods to remove customer data from a mobile device, such as a smartphone, a smart watch, a tablet, or the like. The customer data can include but is not limited to, for example, applications, emails, text messages, digital images, contacts, account information, personal information, product identification, account profiles, user names, passwords, etc. that relate to a previous owner or user of the mobile device. There are systems and methods that use software that interacts with and controls mobile devices in order to clear the data from the device memory. In such systems, the software can be custom-configurable to accommodate different hardware setups and operating systems. For example, a system can support data removal from mobile devices that are running on any operating system, e.g. iOS or Android. For an iOS-based device, the data removal can be performed by pairing the device with a computer to establish a two-way communication. Then, the computer can use various services present on the iOS device to obtain device information and clear data on the device. For an Android-based device, the data removal can be performed using a software application that is installed onto the device. However, these systems and software methods do not work one-hundred percent of the time. As a result, data from a significant percentage of used mobile devices is not able to be cleared using erasure software tools because of hardware issues or physical damage to these devices. Clearing data from more mobile devices will yield more units that can potentially be refurbished and reentered into the ecosystem with less waste and scrap.

The present disclosure is directed to methods and a system to put mobile devices in a state where data can be cleared using erasure software tools (e.g., a common programming interface (CPI) software tool). Depending on the operating system of the mobile device, the erasure system can start an erasure process for that operating system. For example, an iOS erasure process requires no interaction with the mobile device, while an Android erasure process requires that an operator enters a debugging mode on the Android-based device. Other operating systems can have different requirements or processes used to erase data using a software erasure tool.

Different data removal algorithms can be used under different conditions, based on different models and serial numbers of mobile devices, and for different operating systems running on different mobile devices. A data removal algorithm on a computer interfaced to the mobile device can determine what operations will be performed to remove the data from the mobile device. For example, based on the algorithm, automatically performing the removal of the data can include at least one of: removing all data of the mobile device without backup; performing a backup of critical data of the mobile device before the removal; performing a backup of image data of the mobile device before the removal; performing a backup of all data of the mobile device before the removal; or performing an update of software of the mobile device. The algorithm is customizable based on the customer needs. A default algorithm can also be pre-determined for a user without requesting customization.

Figure 2:
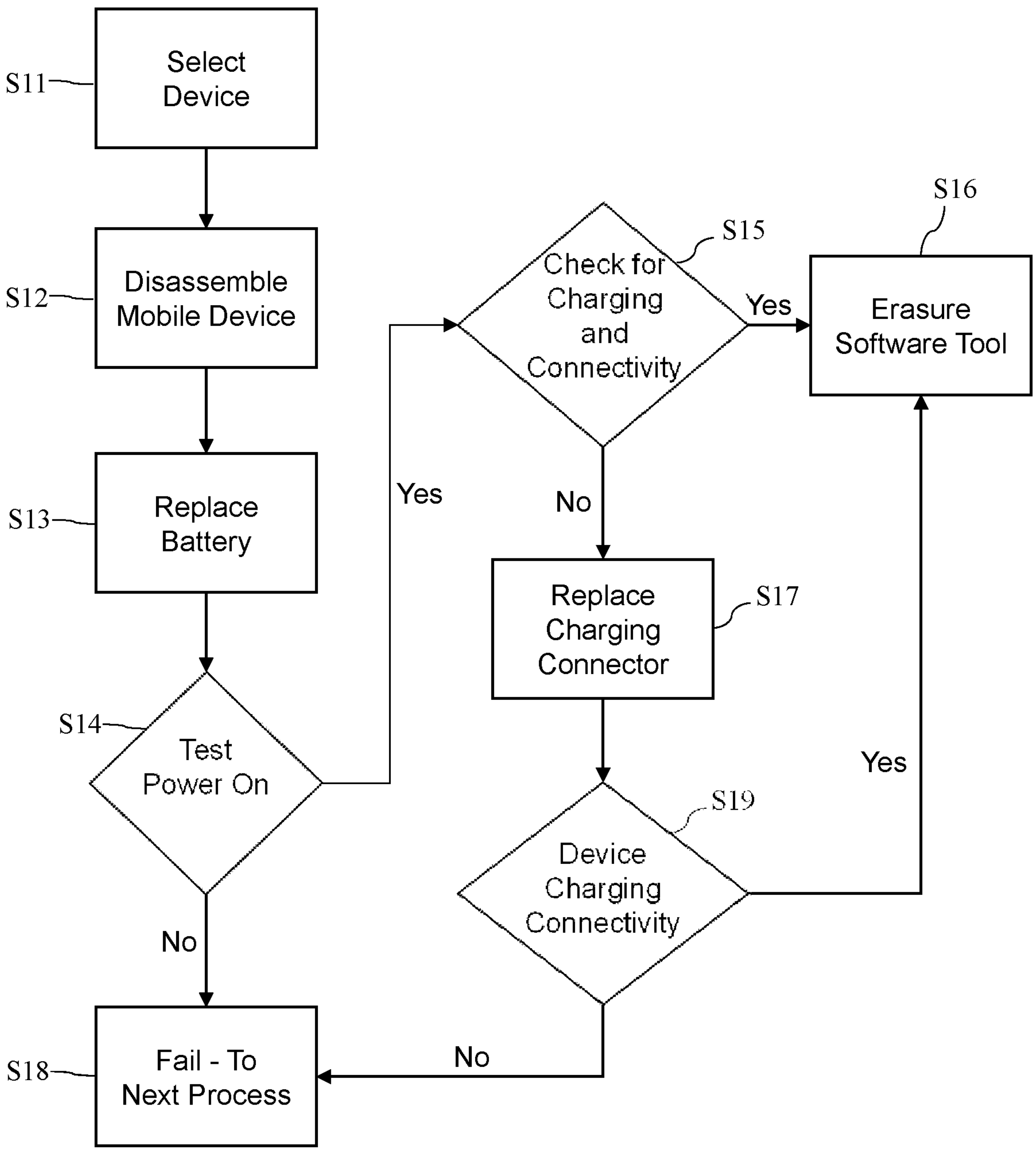
FIG. 2 is flowchart of a method to remove data from a mobile device according to another embodiment of the disclosure.
Figure 3:
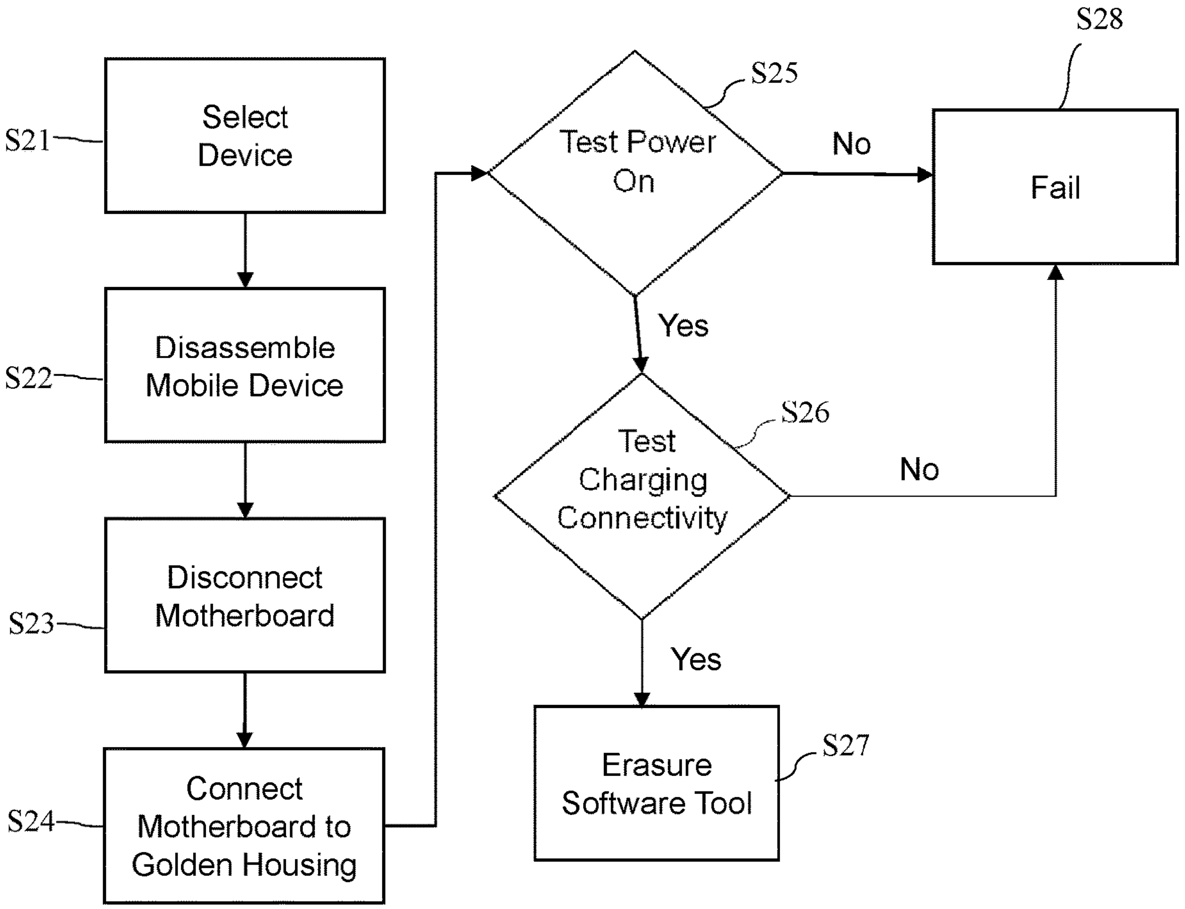
FIG. 3 is flowchart of a method to remove data from a mobile device according to another embodiment of the disclosure.

FIGS. 1-3 are flowcharts describing embodiments of methods that isolate and address hardware issues in mobile devices that prevent a software erasure tool from functioning properly to completely erase existing data on the mobile devices.

FIG. 1 includes steps of advanced charging a mobile device, addressing connectivity to a charging connector (e.g., Universal Serial Bus (USB), Lightning, etc.), and checking power of the mobile device if the electronic display is damaged or not turning on. At first, in step S1, a mobile device is selected. For example, the mobile device selected can be one that has failed a software erasure process. In step S2, the power status of the mobile device is checked by attempting to turn on the mobile device. If the mobile device does turn on, then the ability of the mobile device to be charged is verified in step S3. Charging can be verified by connecting the mobile device to a charger that can be any electronic device, circuitry, or power supply capable of increasing charge to a battery of the mobile device. If the mobile device can be charged in step S3, then data erasure of the mobile device is attempted using a software tool in step S4. If the mobile device powers on and charges but device data cannot be erased using a software tool, then the mobile device can become a candidate for physical destruction and/or scraping as it cannot be put back into service without verification that a previous customer's data has been completely erased.

If the mobile device does not turn on in step S2, then the mobile device is connected to a charger in step S5. After waiting a short period of time, up to about a minute, in step S6, the power status of the mobile device is checked by attempting to turn on the mobile device. If the mobile device does turn on in step S6 or does not appear to be charging in step S3, then the mobile device is attempted to be charged, in an embodiment, for a period of time up to about 45 minutes in step S9 (about including ±5 minutes). It has been empirically found that if a mobile device does not power on after about 45 minutes of charging, the mobile device is not functioning properly. After charging for, in an embodiment, about 45 minutes, then data erasure of the mobile device is attempted using a software tool in step S4. If device data cannot be erased using a software tool in step S4 then the mobile device can become a candidate for physical destruction and/or scrapping.

If the mobile device does not turn on in step S6, then the external area and contacts of the charging connector are cleaned in step S7 and the mobile device is reconnected to a charger. In step S8, the charging status of the mobile device is checked again. If the mobile device is charging in step S8, then the mobile device is charged for a predetermined and/or for a sufficient amount of time (depending on the type of mobile device, battery age, etc.). In an embodiment, the amount of time for charging in step S9 is approximately 45 minutes. In other embodiments, the amount of time for charging in step S9 is in the range of 40-50 minutes, 35-55 minutes, 30-60 minutes, and all ranges in between. Once, in an embodiment, the mobile device is charged for approximately 45 minutes, then data erasure of the mobile device is performed using an erasure software tool in step S4. Using the method described with respect to FIG. 1, the inventors found that the method was able to erase data from more than 25% of the mobile devices that were previously scrapped. If the mobile device is not charging in step S8, then the mobile device is failed for this process in step S10 and becomes a candidate for further screening in steps described with respect to FIG. 2.

If (i) data from a mobile device is unable to be erased using software tools, (ii) the mobile device is unable to power on or has no charging connectivity, or (iii) data from a mobile device is unable to be cleared for some other reason, then the mobile device can be subjected to the steps described with respect to FIG. 2. In the method disclosed with respect to FIG. 2, the mobile device is disassembled, the battery can be replaced, power and charging connectivity can be checked, and the charging connector can be replaced.

In step S11, a mobile device which has failed an erasure software process and has failed to power on or charge is selected. In step S12, the mobile device is disassembled or opened to access the battery. In step S13, the battery can be replaced with a known good battery or power supply. In step S14, the mobile device is attempted to be powered on. If the mobile device does power on, in step S15 the mobile device is connected to a charger to verify connectivity via the charging connector. In step S15, it is confirmed that the charger is connected and that the mobile device is capable of charging the battery. If the mobile device is capable of being connected to the charger and charging the battery, then data erasure of the mobile device is attempted using an erasure software tool in step S16.

If the mobile device does not power on in step S14, then the mobile device has failed the process provided by the method of FIG. 2 in step S18 and becomes a candidate for further screening in steps described with respect to FIG. 3.

If it is determined that the mobile device can power on but is not capable of charging the battery in step S15, then the charging connector is replaced in step S17. In step S19, it is confirmed that the charger is connected and that the mobile device is capable of charging the battery. If the mobile device is capable of being connected to the charger and is charging the battery at step S19, then data erasure of the mobile device is attempted using an erasure software tool in step S16.

After the battery and the charging connector have been replaced and if the data of the mobile device still cannot be erased using the erasure software tool, a device firmware upgrade (DFU) dongle/device can be connected to the mobile device and used to attempt to put the mobile device into recovery mode. Once in recovery mode, a software erasure tool can be used to clear the data of the mobile device. Using the methods described with respect to FIGS. 1 and 2, the inventors found that the methods were able to erase data from more than 70% of the mobile devices that were previously scrapped.

If this fails or if it is otherwise determined that the mobile device is not capable of charging the battery in step S19, then the mobile device has failed the process provided by the method of FIG. 2 in step S18 and becomes a candidate for further screening in steps described with respect to FIG. 3.

If (i) data from the mobile device is unable to be erased using software tools, (ii) the mobile device is unable to power on or has no charging connectivity after replacing the battery and charging connector, or (iii) the data of the mobile device is unable to be erased for some other reason, then the mobile device can be subjected to the steps described with respect to FIG. 3. Although not required, the steps described with respect to FIG. 3 can be performed after performing the steps described with respect to FIGS. 1 and/or 2. In the method disclosed with respect to FIG. 3, the mobile device is disassembled and the motherboard, power, and charging connectivity can be tested.

In step S21, a mobile device which has failed an erasure software process and has failed to charge is selected. In step S22, if the mobile device has not already been disassembled or opened, during step S12, for example, the mobile device can be disassembled or opened to access the motherboard. One of ordinary skill would understand that a motherboard can be a printed circuit board or circuitry containing the principal components of the mobile device (e.g., processor, memory, power distribution, auxiliary component connectors and interfaces, communication interfaces, etc.). The motherboard can include a central communications backbone and connectivity points of a mobile device through which auxiliary components and external peripherals connect, for example, including a charging connector.

In step S23, the motherboard of the mobile device can be disconnected from internal components of the mobile device (e.g., display, battery, charging connector, touch screen, switches, jacks, buttons, camera, etc.) and can be removed from the mobile device. Here, it is assumed that the motherboard includes a memory or storage that contains the customer data desired to be erased. If that customer data is contained in a separate memory device or is split between the motherboard and the separate memory device, then the motherboard and the separate memory device can be handled separately in steps S23-S26.

In step S24, the disconnected/removed motherboard can be connected to or installed into a known good ("golden") housing or test set-up that includes copies of components or subassemblies of and/or are compatible with the mobile device. The golden housing or test set-up can include a known good battery or power supply. In step S25, the golden housing or test set-up can be used to attempt to power on the motherboard. If the motherboard powers on, the charging connector to the motherboard can be tested for connectivity between the charging connector and the motherboard in step S26. If the motherboard of mobile device is capable of powering on and being connected to via the charging connector, then data erasure of the motherboard can be attempted using an erasure software tool in step S27.

If the motherboard does not power on in step S25 or does not allow charging in step S26, then the motherboard has failed the process provided by the method of FIG. 3 in step S28 and becomes a candidate for physical destruction and/or scrapping. Thus, removing customer data can be performed by physical destruction of the motherboard or only the memory chip on the motherboard. After the motherboard powers on and facilitates charging but the data of the mobile device still cannot be erased using the erasure software tool, a device firmware upgrade (DFU) dongle/device can be connected to the motherboard via the test set-up and used to attempt to put the motherboard into recovery mode. Once in recovery mode, a software tool can be used to clear the data of the motherboard.

Using the methods described above with respect to FIGS. 1-3, the inventors found that these methods were able to erase data from about 98% of the mobile devices that were previously scrapped. If the motherboard of the mobile device is not capable of powering or connected to via the charging connector, then the motherboard has failed the process provided by the method of FIG. 3. The remaining components of the mobile device can be paired with a known good motherboard to determine the operational status of those components, which may become candidates for refurbishment or reuse.

Figure 4:
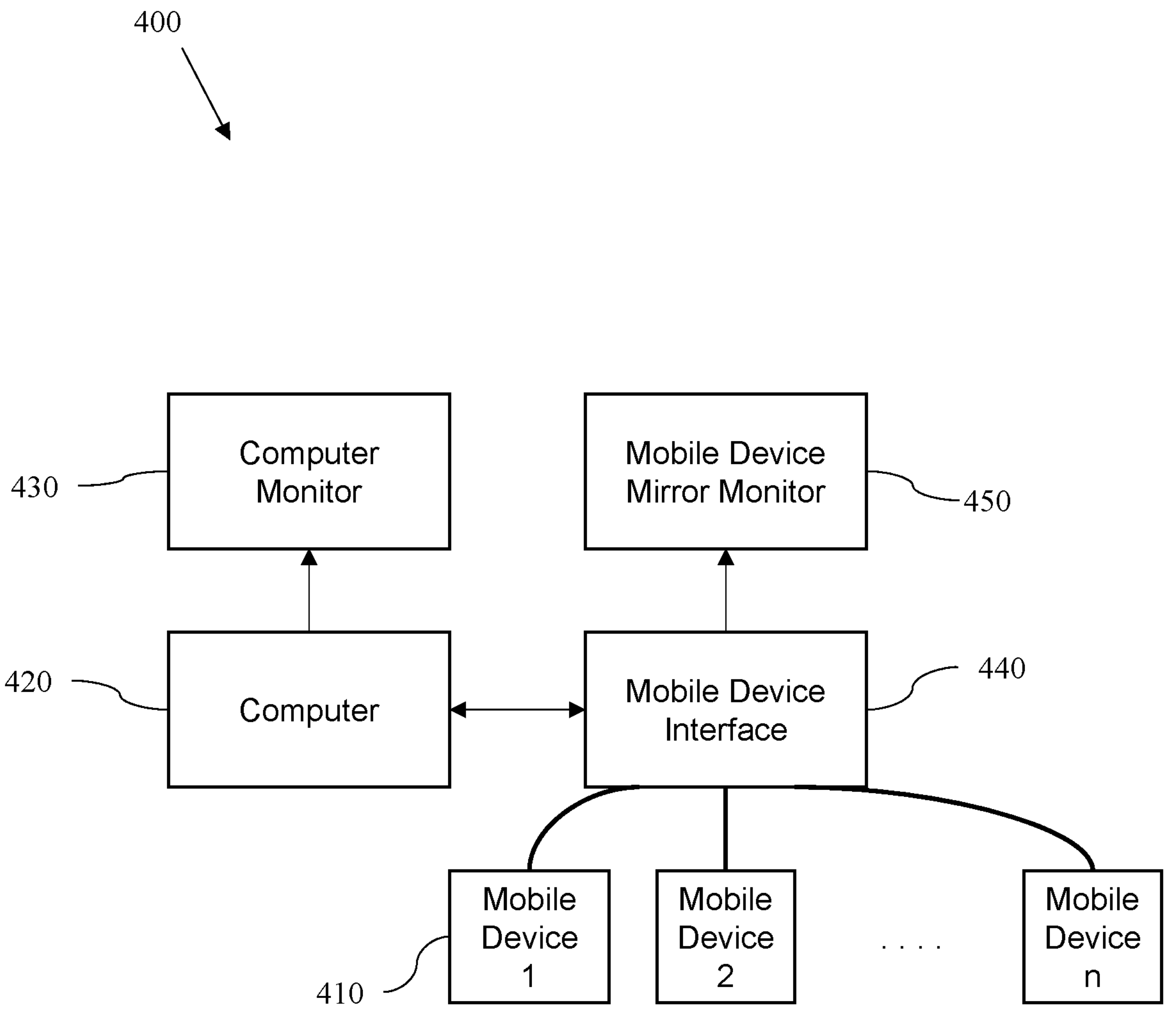
FIG. 4 is an image of a system used to remove data from a mobile device.

FIG. 4 is an image of a system 400 used to remove data from a mobile device 410. As shown, the system 400 can include a computer 420 running a testing application, a computer monitor 430, a mobile device interface 440, and a mobile device mirror monitor 450 to control a mobile device 410 that has a defective display. The system 400 includes a mobile device interface 440 and a separate mobile device mirror monitor 450 to connect with a mobile device 410 and mirror the mobile device display 410 to show what would be shown in the mobile device display on the mobile device mirror monitor 450. The system 400 shows the images from the mobile device 410 on the mobile device mirror monitor 450 permitting keyboard and mouse control so navigation can be performed through the menu and control settings of the mobile device 410 with a defective display. This system 400 also provides connectivity of different types (i.e., brand and model) of up to a number of n mobile devices 410 with different styles of interface connectors. The system 400 is capable of identifying a mobile device 410 connected to it based on the particular mobile device 410 and the interface connector. This permits the system 400 to control the mobile device 410 without having to disassemble the mobile device 410 to attach a working display to it.

The system 400 can include a mobile device interface 440, a hardware interface that provides simultaneous connections to multiple different mobile devices 410. This hardware interface permits an application to control settings of the mobile device 410 and operate a software erasure tool. The system 400 also can screen a mobile device 410 to identify power issues before starting to clear the data with the software erasure tool. The feature facilitates issues with the mobile device interface connector and motherboard to be identified and isolated.

In another method of erasing data from mobile devices with a defective display includes replacing the defective display with a known good ("golden") display for that mobile device model and then controlling the settings of the mobile device to enter a debugging mode. The debugging mode allows the software erasure tool to interface with to the logic board of the mobile device to erase the data.

Although examples are illustrated and described herein, embodiments are nevertheless not limited to the details shown, since various modifications and structural changes may be made therein by those of ordinary skill within the scope and range of equivalents of the claims.

The invention claimed is:

1. A method to completely erase data from a mobile device, the method comprising:

(a) manipulating the mobile device to place the mobile device in an "on" state;

(b) for a condition where the mobile device fails to power on after step (a), connecting the mobile device to a charging device via a charging connector;

(c) for a condition where the mobile device fails to power on after connecting to the charging device, disconnecting the mobile device from the charging device, cleaning the charging connector, and reconnecting the mobile device to the charging device via the charging connector; and (d) determining a charging condition of the mobile device after reconnecting the mobile device to the charging device, wherein:

(i) the mobile device is failed when a determined charging condition is that the mobile device fails to charge;

(ii) the mobile device is charged for a predetermined amount of time when the determined charging condition is that the mobile device is charging;

wherein, the predetermined amount of time is between 40 and 50 minutes;

(e) after charging the mobile device for the predetermined amount of time, completely erasing, by an erasure software tool of an application of a computer connected to the mobile device via a mobile device interface, data from the mobile;

wherein the software erasure tool completely erases the data from the mobile device in a manner such that the data is completely removed;

(f) when the erasure software tool fails to completely erase the data from the mobile device, connecting a device firmware upgrade (DFU) dongle to the mobile device, the DFU dongle configured to override a normal boot sequence of the mobile device and place the mobile device into a recovery mode independent of a user interface of the mobile device, and using the erasure software tool to clear the data of the mobile device while in recovery mode.

2. The method of claim 1, further comprising:

for the condition (i) when the mobile device is failed, performing the following:

disassembling the mobile device;

connecting the mobile device to a known good power supply;

checking if the mobile device powers on;

for a condition when the mobile device powers on, checking if a battery of the mobile device charges;

for a condition when the mobile device does not power on, replacing a charging connector of the mobile device;

after replacing the charging connector, checking if the mobile device charges; and for a condition when the mobile device charges, using a software tool to completely erase the data from the mobile device.

3. The method of claim 1, further comprising: determining that a mobile device has failed an automatic complete data erasure process.

4. The method of claim 1, wherein the mobile device has a defective display, and further comprising:

connecting the mobile device to a mobile device mirror monitor that displays a same image as that provided to the defective display of the mobile device, and controlling settings of the mobile device via the mobile device mirror monitor to enable the erasure software tool to completely erase the data.

5. The method of claim 1, further comprising:

refurbishing the mobile device for reuse after completely erasing the data from the mobile device.

6. The method of claim 1, wherein applying the erasure software tool comprises entering a debugging mode on the mobile device.

7. The method of claim 1, wherein the mobile device has previously failed a software erasure process.

8. A method to completely erase data from a mobile device, the method comprising:

disassembling the mobile device;

connecting the mobile device to a known good power supply;

checking if the mobile device powers on;

for a condition when the mobile device powers on, checking if a battery of the mobile device charges;

for a condition when the mobile device charges, using a software tool to completely erase, by an erasure software tool of an application of a computer connected to the mobile device via a mobile device interface, the data from the mobile device;

wherein the software erasure tool completely erases the data from the mobile device in a manner such that the data is completely removed; and for a condition when the mobile device does not power on, replacing a charging connector;

and when the erasure software tool fails to completely erase the data from the mobile device, connecting a device firmware upgrade (DFU) dongle to the mobile, the DFU dongle configured to override a normal boot sequence of the mobile device and place the mobile device into a recovery mode independent of a user interface of the mobile device, and using the erasure software tool to clear the data of the mobile device while in recovery mode.

9. The method of claim 8, further comprising:

after replacing the charging connector, checking if the mobile device charges;

for a condition when the mobile device does not charge, performing the following:

disconnecting a motherboard from the mobile device;

connecting the motherboard to known good compatible circuitry;

checking if the motherboard connected to the compatible circuitry powers on;

for a condition when the motherboard powers on, checking a charging operation of the motherboard;

for a condition when the motherboard powers on and the charging operation is operating, using a software tool to erase the data from the motherboard; and for a condition when the motherboard does not power on or the charging operation is not operating, physically destroying the motherboard or a memory chip on the motherboard.

10. The method of claim 8, further comprising: determining that a mobile device has failed an automatic complete data erasure process.

11. A method to completely erase data from a mobile device, the method comprising:

disassembling the mobile device;

disconnecting a motherboard from the mobile device;

connecting the motherboard to known good compatible circuitry;

checking if the motherboard connected to the compatible circuitry powers on;

for a condition when the motherboard powers on, checking a charging operation of the motherboard;

for a condition when the motherboard powers on and the charging operation is operating, completely erasing, by an erasure software tool of an application of a computer connected to the mobile device via a mobile device interface, the data from the motherboard;

wherein the software erasure tool completely erases the data from the mobile device in a manner such that the data is completely removed; and for a condition when the motherboard does not power on or the charging operation is not operating, physically destroying the motherboard or a memory chip on the motherboard; and when the erasure software tool fails to completely erase the data from the mobile device, connecting a device firmware upgrade (DFU) dongle to the mobile, the DFU dongle configured to override a normal boot sequence of the mobile device and place the mobile device into a recovery mode independent of a user interface of the mobile device, and using the erasure software tool to clear the data of the mobile device while in recovery mode.

12. The method of claim 11, further comprising: determining that a mobile device has failed an automatic complete data erasure process.

* * * * *